United States Patent [19]
Pelkey

[11] 3,732,493
[45] May 8, 1973

[54] ELECTRICAL COMPENSATING CIRCUIT

[75] Inventor: William H. Pelkey, Winooski, Vt.

[73] Assignee: Simmonds Precision Products, Inc., Tarrytown, N.Y.

[22] Filed: Mar. 12, 1971

[21] Appl. No.: 123,718

[52] U.S. Cl. .................324/166, 324/173, 328/34
[51] Int. Cl. .............................................G01p 3/48
[58] Field of Search.....................324/166, 167, 173, 324/174; 328/27, 34

[56] References Cited

UNITED STATES PATENTS 3,349,257 10/1967 Thomas et al. ...................328/27 X
3,418,528 12/1968 Watanabe et al.................324/166 X

*Primary Examiner*—Rudolph V. Rolinec
*Assistant Examiner*—Ernest F. Karlsen
*Attorney*—Edwin E. Greigg

[57] ABSTRACT

A circuit which reconditions a pulsed signal of varying duty cycles to a signal of 50% duty cycle by utilizing a feedback network. The network generates a correcting signal to any deviation to maintain a 50 percent duty cycle at the output.

6 Claims, 1 Drawing Figure

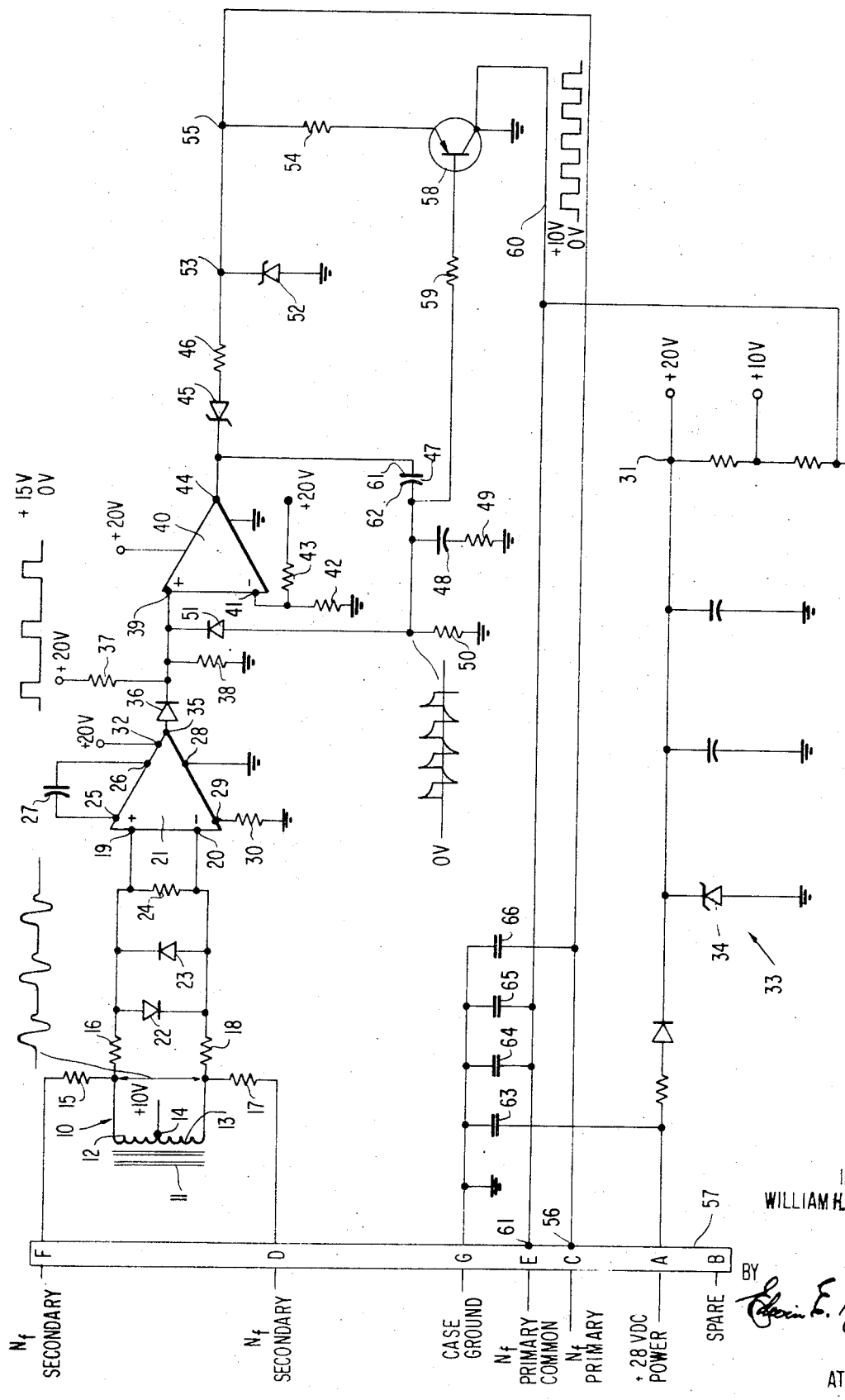

ELECTRICAL COMPENSATING CIRCUIT

The present invention relates to an electrical compensating circuit, and, more particularly, to a self-compensation feedback circuit for an operational amplifier to condition any input pulse signal to create and maintain a 50 percent duty cycle while maintaining input frequency.

In modern aircraft the speeds of the engines are measured utilizing sensors to count the number of turbine blades passing a given point in a standard time. The output of the sensor is a series of pulses whose shape and frequency are related to the effective spacing of the blades, the size of the blades, and their effect upon the sensor. Typically, the pulses are narrow compared to a one cycle reference. The pulses are of low amplitude and, accordingly, are amplified, using operation amplifiers, for transmission to the device for converting them to a meter display. The output of the operational amplifier is a square wave.

Transmission of such signals over long unshielded transmission lines may radiate radio frequency noise, hence it is usually a requirement to use shielded cable for such transmissions. In aircraft, such as the McDonnell Douglas DC-10, when signal lines are almost 200 ft. long, the elimination of shielding can result in significant savings in weight and, consequently, in an increase in pay load. The long lines are required because the sensors are mounted on the engines, while the signals are utilized in the cockpit of the aircraft for driving RPM indicators and various control systems.

It is well-known that if square wave pulses having low duty cycles are transmitted over unshielded lies, they will radiate excessive amounts of RFI since they contain certain harmonics of substantial energy levels related to pulse width, time between pulses, and pulse amplitude. By changing the duty cycle to 50 percent, while retaining the basic frequency information, the signal will contain fewer harmonic frequencies with significant energy levels, and, therefore, the probability of radiating radio frequency noise is reduced.

Therefore, it is the principal object of this invention to provide a method of conditioning a pulsed signal to obtain a 50 percent duty cycle while maintaining the basic frequency information.

It is a further object of this invention to provide a method for conditioning a pulsed signal, which is self-compensating or correcting to maintain a 50 percent duty cycle regardless of variations in input pulse width.

It is another object of this invention to provide a manner of conditioning a pulsed signal to obtain a 50 percent duty cycle which is not affected by the frequency of the signal.

It is a further object of this invention to provide a transmission mode for square wave pulsed signal information to be transmitted over unshielded lines with reduced RFI.

It is also an object of this invention to provide for a reduction of weight in aircraft by eliminating the need for a portion of the coaxial cable and connectors used therein.

It is also another object of this invention to provide a more economical method for installation of an engine speed indicating system in aircraft.

It is a further object of this invention to create a frequency signal which can be transmitted over unshielded lines, maintaining basic frequency information, but also reducing radio frequency interference.

The invention will be better understood and further objects and advantages will become more apparent from a reading of the following specification taken in conjunction with the drawing in which:

The FIGURE shows a schematic view of the basic invention.

Referring now to the FIGURE there is shown an eddy current sensor 10 from which the input signal is derived, composed of a laminated magnetic core 11 with two windings 12 and 13, which are connected at 14 so that they magnetically oppose each other; one end of winding 12 is connected to the juncture of resistors 15 and 16, and the other end of winding 13 is connected to the juncture of resistors 17 and 18. Resistor 16 is connected at its other end to positive input terminal 19 of amplifier 21 and resistor 18 is connected at its other end to the negative input terminal 20 of amplifier 21. Two diodes 22 and 23 are connected with opposite polarity and in parallel across the positive and negative input terminals of amplifier 21, said terminals also having connected thereto the terminal ends of resistor 24. Between terminals 25 and 26 of amplifier 21 is connected capacitor 27, and from terminal 29 of said amplifier to ground is connected resistor 30, and the terminal 28 is grounded as is commonly known and used in the art. The amplifier 21 derives its power from point 31 of the power supply being connected by a conductive lead wire to point 32 of said amplifier, the power supply 33 having its maximum voltage governed by zener diode 34, it and the other components used in the common manner obvious to those skilled in the art. Capacitors 63 through 66 do not affect the operation of the circuit and are merely used for noise suppression.

Connected to output terminal 35 of amplifier 21 is the negative lead of a diode 36, the positive lead of which is connected through resistor 37 to the power supply point 31 and through resistor 38, connected to the junction between diode 36 and resistor 37, then to ground, resistors 37 and 38 forming a voltage divider to back bias diode 36 for purposes of improving noise immunity. When the positive input of amplifier 21, point 19, is driven positive, the output at point 35 is positive which, after overcoming the back bias of diode 36, shows up as a series of positive square wave pulses which are applied to the positive input terminal 39 of operational amplifier 40. Connected to the negative input terminal 41 of amplifier 40 is a resistor 42, the other end of which is connected to ground, and a resistor 43, the other end of which is connected to the positive voltage supply, thereby forming a voltage divider biasing the negative input terminal and, in conjunction with the voltage divider made up of resistors 37 and 38, suitably biases the amplifier so that the output terminal, point 44, has a small output level, i.e., approximately 2.5 volts when no signal is applied to the input. The amplifier is powered and grounded in the common manner hereinbefore described for amplifier 21. When the positive input terminal 39 is driven positive by more than a critical voltage, e.g., 7.5 volts, the output terminal 44 is driven positive to form a square wave output of approximately +17 volts.

Connected to the output of amplifier 40 at point 44 is the positive lead of zener diode 45, the negative lead being connected to resistor 46. Also connected to the output of amplifier 40 is the positive lead of capacitor 47, the negative side being connected to the positive side of capacitor 48 which has substantially less capacity, the other side of which is connected to resistor 49, said resistor hereafter being connected to ground. Also connected to the positive lead of capacitor 48 is a resistor 50, its other lead connected to ground, and the negative lead of diode 51, its positive lead connected to the positive input of amplifier 40 at point 39. Referring back to resistor 46, its second lead is connected to the positive lead of zener diode 52 at point 53, and to one lead of resistor 54 at point 55. The output lead of the signal conditioner is connected between point 55 and pin 56 of the connector 57, shown schematically.

Referring back to resistor 54, its second lead is connected to the emitter of transistor 58, the base of which is connected to one lead of resistor 59, the other lead being connected to the negative lead of capacitor 47, hereinbefore mentioned. The collector of transistor 58 is commonly grounded with other grounds of the system, and is also connected by lead 60 to pin 61 of the connector 57, shown schematically.

The circuit operation revolves about the feedback loop around amplifier 40. With a positive pulse applied on the input pin 39 of amplifier 40, it turns on and the output voltage at pin 44 goes from 2.5 V to 17 volts. Capacitor 47 which has been charged to 2.5 volts has the output voltage applied to plate 61' which first causes plate 62 to rise to 17 volts since the voltage across a capacitor cannot change immediately. This applies 17 volts through diode 51 to the input 39. Then capacitor 47 begins to charge through resistor 50 and the voltage on plate 62 begins to decay towards zero. The input pulse from amplifier 21 then cuts off, but because of the feedback through diode 51 amplifier 40 is held on after said pulse has been removed and the output of amplifier 40 remains at 17 volts and continues charging capacitor 47. When the voltage on plate 62 drops below the required voltage to forward bias diode 51, the positive feedback to input terminal 39 is eliminated and the output of amplifier 40 returns to 2.5 volts. The drop in voltage on plate 61' of capacitor 47 causes plate 62 to first become negative, its voltage dropping an amount equal to the drop on plate 61' thus accounting for the negative spike in the diagram at the junction between resistor 50 and diode 51. Capacitor 47 then starts to charge towards zero but the next pulse from the sensor is impressed upon the input 39 raising the output voltage again to 17 volts and thereby raising the voltage on plate 62 by 17 − 2.5 volts. Since the decay time from its most negative point was less than the decay time of the first positive spike, the voltage on plate 62 will not be raised as high and, therefore, the decay time to the diode 51 cut off will be shorter. When amplifier 40 cuts off, the voltage on plate 62 again first goes negative and begins to charge towards zero, however, since the decay from positive was shorter, the decay from negative is longer since the time period between pulses from amplifier 21 remains the same. As the cycles progress, the circuit seeks a condition in which the current flow into capacitor 47 is equal to the current flow out and the duty cycle becomes 50 percent. If the frequency changes, the circuit repeats the same correcting procedure. Capacitor 47 and resistor 50 are suitably chosen such that the decay time to the point at which diode 51 cuts is equal to 50 percent of the cycle time at the lowest frequency to be measured.

The uniqueness of the circuitry associated with amplifier 40 is that it is self-correcting to maintain a 50 percent duty cycle. If the duty cycle on the output of the amplifier 40 changes then average DC voltage across capacitor 47 changes which shifts the voltage lever across resistor 50 to restore a 50 percent duty cycle. eliminated and the output of amplifier 44 returns to 2.5 volts. The drop in voltage on plate 61' of capacitor 47 causes plate 62 to become negative, maintaining the same voltage difference across the plates, and to decay towards zero from the negative voltage, thus accounting for the It must be recognized that the voltages given in the description are for purposes of clarity and explanation, and could be substantially different by the changing of the components and suitable changing of component values without, however, changing the basic manner in which the circuit operates. It should be clear that minor changes may be made in the circuit, which do not affect the basic function of providing for and compensating the development of a 50 percent duty cycle, without departing from the spirit of this invention.

What is claimed is:

1. An electric circuit for changing a high frequency signal from an eddy current sensor used to detect an engine speed, the combination comprising, an eddy current sensor means associated through coupling means to the input of a first operational amplifier means having an input and an output, said output being connected through a diode means to the positive input of a second operational amplifier means having an input and an output, said output of the second operational amplifier means being transmitted as a square wave through the output lead to a frequency meter means in which a portion of the output of the second operational amplifier means is fed back to the positive input of said second operational amplifier means through a timing circuit means and wherein said timing circuit means is arranged to hold the second operational amplifier means on for a fixed percentage of each cycle without modifying the basic frequency of the signal after the original input signal from the first operational amplifying means has been stopped, whereby the output of the circuit is modified to a constant duty cycle greater than that originally applied.

2. An electric circuit as claimed in claim 1, wherein the timing circuit is a resistive capacitor (RC) timing circuit the output of which feeds through a second diode to the positive input of the second operational amplifier means and wherein as said capacitor charges through said resistor, feedback voltage drops until at a predetermined duty cycle positive feedback is removed from the input of the second operational amplifier.

3. An electric circuit as claimed in claim 2, wherein the RC timing circuit means and the second diode means are arranged so that as the duty cycle of the output of said second amplifier changes, the decay time of the RC network changes in a manner to return the output to the originally chosen duty cycle.

4. An electric circuit as claimed in claim 2, wherein the output of the second operational amplifier means is held at zero by a transistor means during the period that the second operational amplifier has low output.

5. A circuit as claimed in claim 2, wherein the first RC timing circuit means further includes a second RC timing circuit means, associated with the first RC timing circuit means said second RC timing circuit means being arranged to operate at high frequencies.

6. An electric circuit as claimed in claim 1, wherein the constants of the timing circuit are arranged to provide a 50 percent pulse duty cycle on the output lead of the circuit.

* * * * *